(12) United States Patent
Pels et al.

(10) Patent No.: US 6,209,692 B1
(45) Date of Patent: *Apr. 3, 2001

(54) ELECTRIC MACHINE FOR DAMPENING VIBRATIONS IN A DRIVE TRAIN AND METHOD OF USING THE SAME

(75) Inventors: Thomas Pels, Achern; Klaus-Peter Zeyen, Cologne; Ullrich Masberg, Rosrath; Rahim Pour, Garching; Michael Maurer, Munich; Willibald Birzl, Karlshuld; Wolfgang Wall, Zorneding, all of (DE)

(73) Assignees: ISAD Electronic Systems GmbH & Co., KG, Cologne (DE); Bayerische Moloren Werke, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/241,952

(22) Filed: Feb. 2, 1999

Related U.S. Application Data

(63) Continuation of application No. PCT/DE97/01628, filed on Jul. 29, 1997.

(30) Foreign Application Priority Data

Aug. 2, 1996 (DE) .............................................. 196 31 384

(51) Int. Cl.[7] ........................................................ F16F 11/00
(52) U.S. Cl. ........................ 188/381; 310/75 R; 310/92; 464/82
(58) Field of Search .................................. 188/293, 294, 188/269, 381, 379, 380; 310/51, 92, 98, 74, 102 R, 75 R; 464/29, 61, 62, 82, 83; 180/165; 74/574

(56) References Cited

U.S. PATENT DOCUMENTS

| | | | |
|---|---|---|---|
| 3,636,468 | * 1/1972 | Ellis | 331/4 |
| 4,326,158 | * 4/1982 | Helgesen | 310/74 |
| 4,471,248 | 9/1984 | Smetana | 310/51 |
| 4,499,965 | * 2/1985 | Oetting et al. | 180/165 |
| 4,699,097 | 10/1987 | Tanaka et al. | 123/192 R |
| 4,782,936 | * 11/1988 | Bopp | 192/208 |
| 4,790,212 | * 12/1988 | Sibeud | 310/102 R |

(List continued on next page.)

FOREIGN PATENT DOCUMENTS

| | | |
|---|---|---|
| 40 38 301 A1 | 6/1991 | (DE) . |
| 41 00 937 A1 | 8/1991 | (DE) . |
| 42 15 441 A1 | 11/1993 | (DE) . |
| 295029 05 | 2/1995 | (DE) . |
| 44 06 481 A1 | 9/1995 | (DE) . |
| WO 90/01126 | 2/1990 | (WO) . |

OTHER PUBLICATIONS

PCT *International Search Report* dated Jul. 29, 1997 regarding PCT Patent Application Serial No. PCT/DE97/01628.

PCT *International Preliminary Examination Report* dated Sep. 28, 1998 regarding PCT Patent Application Serial No. PCT/DE97/01628 and annexes (with full translations thereof).

*Primary Examiner*—Matthew C. Graham
*Assistant Examiner*—Thomas J. Williams
(74) *Attorney, Agent, or Firm*—Marshall, O'Toole, Gerstein, Murray & Borun

(57) ABSTRACT

An electric machine with a stator and a rotor arranged in the drive train of a drive unit is disclosed. A vibration insulation device is incorporated in the rotor of the electric machine. The electric machine can function as a starter/generator, a generator vehicle brake, an auxiliary drive and/or an active vibration damper.

19 Claims, 1 Drawing Sheet

U.S. PATENT DOCUMENTS

| | | | | |
|---|---|---|---|---|
| 5,095,771 | * | 3/1992 | Kuhne | 74/572 |
| 5,185,543 | * | 2/1993 | Tebbe | 310/51 |
| 5,691,588 | * | 11/1997 | Lutz et al. | 310/92 |
| 5,755,302 | * | 5/1998 | Lutz et al. | 180/65.2 |
| 5,773,904 | * | 6/1998 | Schiebold et al. | 310/92 |
| 5,865,278 | * | 2/1999 | Wagner | 188/381 |
| 5,880,544 | * | 3/1999 | Ikeda et al. | 310/74 |
| 5,884,740 | * | 3/1999 | Sudau et al. | 192/70.17 |

* cited by examiner

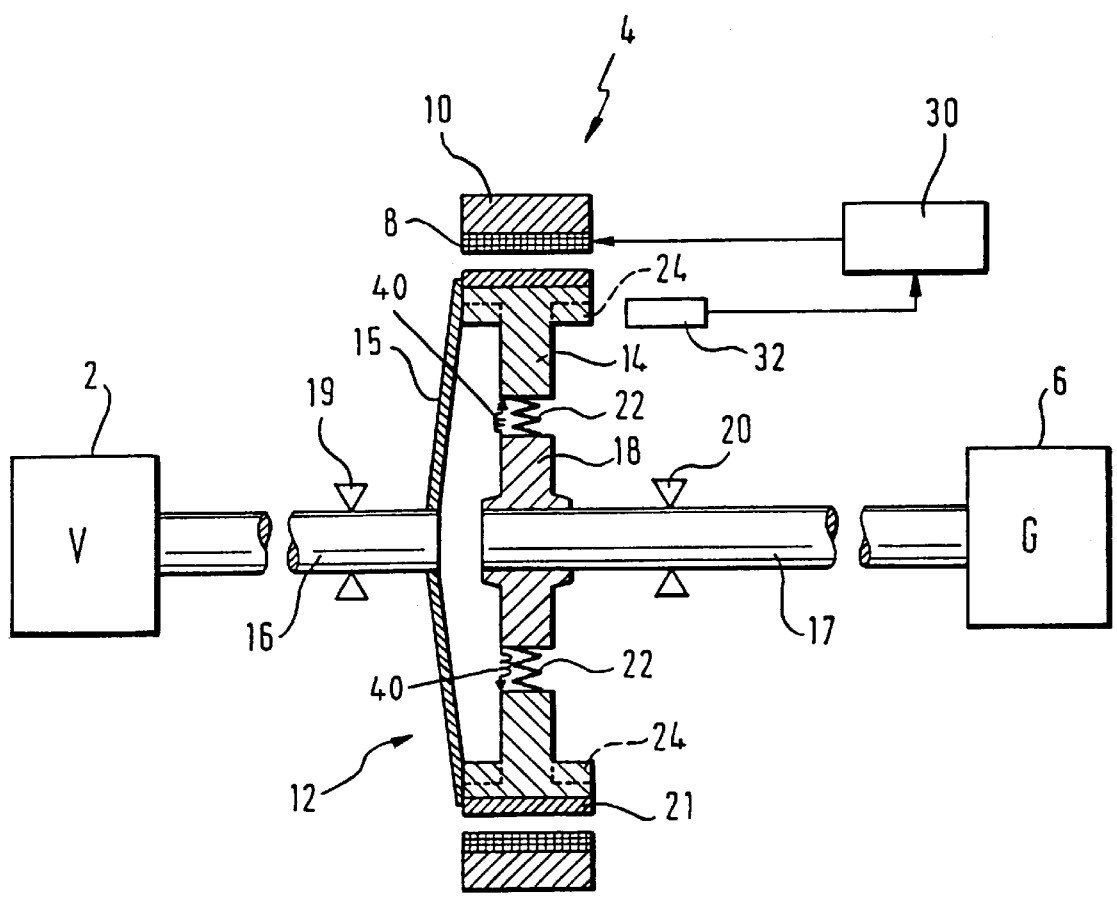

ELECTRIC MACHINE FOR DAMPENING VIBRATIONS IN A DRIVE TRAIN AND METHOD OF USING THE SAME

RELATED APPLICATION

This patent is a continuation of co-pending international patent application Serial No. PCT/DE97/01628 which was filed on Jul. 29, 1997.

FIELD OF THE INVENTION

The invention relates generally to drive trains, and, more particularly, to an electric machine for achieving vibration dampening in a drive train. The invention also concerns a method for operation of this type of electric machine, especially in a vehicle.

BACKGROUND OF THE INVENTION

Owing to the discontinuous method of operation, a number of different vibration phenomena occur in an internal combustion piston engine. Torsional vibrations in the drive train of a vehicle caused by torque fluctuations of the internal combustion engine are particularly noticeable. These vibrations propagate over the other vehicle components and often lead to a noise and vibration level that disturb the vehicle occupants. The linear vibrations of the entire engine block caused by inertial forces associated with the internal combustion engine, which can also propagate over the drive train, are also significant.

To reduce these torsional vibrations, DE 41 00 937 A1 proposes that a passive torsional vibration dampener be arranged in the drive train of the vehicle between its internal combustion engine and its transmission. The proposed passive dampener has an input part driven by the internal combustion engine and an output part positioned on the input shaft of the transmission. The output part is connected to the input part in torsionally elastic fashion by a spring system. An active torsional vibration dampener in the form of an electric machine is also provided in the drive train behind the previously mentioned passive torsional vibration dampener. The rotor of the active torsional vibration dampener sits on the input shaft of the transmission and counteracts the torque fluctuations still remaining at the output of the passive torsional vibration damper. However, this arrangement is often unusable under practical conditions because of the limited space available in the drive area of many vehicles.

A starter/generator whose rotor sits on a rotating shaft with a drive unit, (for example, a crankshaft of an internal combustion engine), and at the same time is designed as a passive torsional vibration absorber, is also known from DE 44 06 481. The rotor of this known apparatus consists of a ring-like absorption mass (elastically connected via a rubber layer), which can be rotated relative to the rotating shaft within the scope of elastic couplings. The elastic couplings do not interrupt the torque path of the shaft. Instead, the shaft is rigidly continuous. Thus, instead of performing vibration dampening, the elastic couplings serve only for coupling a free absorber mass to the shaft.

The absorber effect of this known apparatus is achieved by detuning the oscillation system. Specifically, by virtue of the absorber mass, the base system acquires an additional degree of freedom which shifts the resonance frequencies. This expedient, however, is only fully effective if excitation of the base system occurs with a fixed frequency in the vicinity of (unshifted) resonance. Since internal combustion engines are generally operated with variable speed, and since the number of vibration absorbers that can be implemented under practical conditions is limited, resonances are unavoidable under this known approach.

SUMMARY OF THE INVENTION

In accordance with an aspect of the invention, an apparatus is provided for use with a drive train having a drive side, a driven side and a torque path. The apparatus includes a stator and a rotor disposed adjacent the stator within the torque path of the drive train. The rotor defines a substantially hollow interior. The apparatus also includes a vibration insulation device disposed at least in part within the hollow interior of the rotor and within the torque path of the drive train.

Other features and advantages are inherent in the apparatus claimed and disclosed or will become apparent to those skilled in the art from the following detailed description and its accompanying drawings.

BRIEF DESCRIPTION OF THE DRAWING

The sole FIGURE is a schematic illustration of an electric machine constructed in accordance with the teachings of the invention shown in cross section in an exemplary environment of use.

DESCRIPTION OF THE PREFERRED EMBODIMENTS

Although, for simplicity of explanation, the following description describes an electric machine 4 constructed in accordance with the teachings of the invention in connection with a drive train of an internal combustion engine of a vehicle, persons of ordinary skill in the art will readily appreciate that the teachings of the invention are not restricted to this particular environment of use. On the contrary, persons of ordinary skill in the art will appreciate that the teachings of the invention may be applied to other drive systems such as, for example, machine tools, without departing from the scope or spirit of the invention.

The torque transfer path of the drive train illustrated in the FIGURE runs from an internal combustion engine 2 via conventional connecting elements (not shown), such as a clutch, to an electric machine 4, and via additional conventional connecting elements (also not shown), like an additional clutch, articulated shafts, etc., to a transmission 6. In the illustrated example, the transmission 6 drives the wheels of a vehicle in a known fashion.

The electric machine 4 is situated in the torque transfer path. As shown in the FIGURE, the electric machine 4 has a fixed stator 10 fastened on either the engine housing or on the vehicle body. The stator 10 is provided with stator coils 8. The electric machine 4 also has a rotatable rotor 12 arranged in the drive train. The rotor 12 includes an outer annular part 14, which combines in one piece (a) the electric and magnetic functions of the rotor 12, and (b) the function of one of the two basic elements of a vibration insulation device. The annular part 14 is referred to herein as the primary part of the vibration insulation device. The primary part 14 is connected to rotate in unison with the drive side of the drive train which is implemented in this illustration as a crankshaft of the internal combustion engine 2. The connection to the drive shaft may optionally be made via couplings and/or connection shafts (not shown). As shown in the illustration, the primary part 14 is preferably supported on the shaft by a support 15, implemented in this embodiment as a one-sided cage.

The vibration insulation device also comprises an internal, essentially disk-like, secondary part 18. The secondary part 18 is concentrically located within the opening of the annular primary part 14. As shown in the illustration, the secondary part 18 is connected to rotate in unison with the driven side of the drive train, which leads to the transmission 6. The secondary part 18 preferably grades into a hub, which is rigidly positioned on a shaft leading to transmission 6, (optionally, via additional shafts and couplings as mentioned above).

The drive train shafts are mounted in bearings 19, 20 in front of and/or behind the electric machine 4. This means that the rotor 12 is only supported on one side, since, as explained below, the primary and the secondary parts are only coupled via an elastic coupling.

The illustrated electric machine 4 is an asynchronous machine whose stator coils 8 are designed as a three-phase current winding, which is supplied by a pulse inverter to generate rotational fields with a current of freely adjustable frequency, phase and/or amplitude. The electrically or magnetically active outer part of the primary part 14 forms a short circuit squirrel cage with cage bars 21 running in the axial direction of the cage. The cage bars 21 are electrically and mechanically connected on their ends to conductors running along the periphery of the cage. When applied, outer rotational fields will induce currents in the squirrel cage so that a torque is exerted on the rotor 12.

The primary part 14 and the secondary part 18 of rotor 12 are mounted to rotate on the same axis and are coupled in torsionally elastic fashion via a vibration insulation element 22 shown only schematically. The vibration insulation element 22 comprises one or more coil or helical springs. In a preferred variant, the inner primary part 14 encompasses the outer secondary part 18 in the radial direction so that the outer primary part 14 can be rotated on or relative to the secondary part 18. Moreover, several coil springs are arranged in the peripheral direction between the primary and secondary parts 14, 18 and are each attached with one end to primary part 14 and with the other end to secondary part 18 so that the primary and secondary parts 14, 18 are coupled in torsionally elastic fashion via the coil springs.

The drive torque of the internal combustion engine 2 is transferred via crankshaft 16 to the primary part 14 which is rigidly connected to crankshaft 16 via support 15. The drive torque is also transferred to the secondary part 18 via the vibration insulation element 22; and from the secondary part to the transmission 6 via the shaft 20. Any torque fluctuations on the drive side of the drive train that are attributed to the discontinuous method of operation of the piston internal combustion engine are dampened by the vibration insulation element 22 in the rotor 12 of the electric machine 4, (i.e., such vibrations are either not transferred or are only transferred to a limited degree to the secondary part 18 and, thus, to the driven side of the drive train).

The vibration insulation is more effective, the further the exciter frequency, (here the frequency of the torque fluctuations of the internal combustion engine 2), lies above the natural frequency of the oscillation system, (i.e., the lower the resonance frequency). The masses that are necessarily present (and consequently the moments of inertia) in the drive train shafts as well as the masses of the primary and secondary parts together with the spring rigidity of the vibration insulation element 22 define the resonance frequency of the present vibration system. If the resonance frequency does not lie low enough, additional masses 24 (preferably annular in form) are provided, for example, on the primary part 14 (as indicated with the dashed lines) and/or on the secondary part 18 (not shown) in order to shift the natural frequency of the drive train below the exciter frequency range.

The electric machine 4 can also assume the function of a starter to start an internal combustion engine in a vehicle, and/or the function of a generator for supplying power to the vehicle. For this purpose the electric machine 4 is connected to a control device 30, which influences the exciter currents of the stator windings 8 so that, during activation of the vehicle ignition key, the electric machine 4 operates as motor (starter) to start the internal combustion engine and then is switched to generator operation.

Moreover, the electric machine 4 can also serve as a generator brake for wear-free vehicle braking with recovery of the brake energy (so-called retarder function), as well as a drive and acceleration support of the internal combustion energy (so-called booster function).

The electric machine 4 can also serve as an active torsional vibration dampener to, for example, compensate for rotational irregularities in the drive train which are primarily attributed to gas and mass forces of the internal combustion engine 2. For this purpose the control device 30 controls the exciter currents of the stator windings 8 so that the torque exerted on the primary part 14 of the rotor 12 counteracts any torque fluctuations of the primary part 14 and, thus, any torque fluctuations present in the crankshaft driven by the internal combustion engine and any shafts coupled to it, for example, in counterphase. In this fashion torsional vibrations are largely actively compensated. Should any residual vibrations remain on the primary part 14, however, these residual vibrations are shielded from the driven side by the vibration insulation element 22 between the primary and secondary parts.

As shown in the FIGURE, active vibration damping can occur in controlled fashion. For example, a speed sensor 32 can be arranged at an appropriate site in the vicinity of primary part 14 in order to continuously measure the instantaneous speed or angular segment speed of the primary part 14. The instantaneous speeds determined by the speed sensor 32 are fed to the control device 30 (which may, for example, be implemented by a programmed microprocessor), which compares the instantaneous value with a stipulated reference value and then generates a control difference signal as a gauge for any instantaneous or periodic rotational irregularity of the primary part 14. The exciter currents of the stator 10 are controlled based on this control difference so that the primary part 14 is exposed to an alternating torque of opposite phase of the same magnitude as the rotational irregularity. As an alternative, a controlled active damping is also possible, in which the expected rotational irregularity is taken from a prestored characteristic and serves to generate an alternating torque of the same magnitude of opposite phase.

Of course, persons of ordinary skill in the art will readily appreciate that the electric machine 4 can be used for vibration damping and for generator current production simultaneously without departing from the scope or the spirit of the invention.

From the foregoing, persons of ordinary skill in the art will appreciate that the disclosed electric machine 4 inserts vibration insulation in the drive train and the vibration insulation is integrated in the rotor 12 of the electric machine 4.

The rotor 12 of the electric machine 4, as far as its electric and magnetic function is concerned, is preferably hollow on the inside, (i.e., no electric and/or magnetic reflux occurs via the rotor axis). The rotor 12 is similar to a hollow cylinder. The hollow space in the rotor 12 then serves to accommodate the vibration insulation elements 22.

The illustrated electric machine 4 achieves many advantages, especially when used in vehicles. For example, the illustrated electric machine 4 combined with the vibration insulation device is characterized by a simple and compact design. By integrating the vibration insulation device in the rotor 12 the weight and the dimensions of the combined system are decidedly reduced, so that the electric machine 4 and the vibration insulation device can be accommodated in the engine or drive area of a vehicle even with limited space. Unlike the known vibration damping system described above, in the disclosed device the vibration insulation device is part of the electric machine 4 which is itself positioned in the drive train of the drive unit. This type of integration implies different space utilization, mainly in the direction of radial extent of the vibration insulation. This is advantageous if the vibration properties of the drive train are to be varied by increasing the moment of inertia. With this type of radial arrangement a higher moment of inertia is achieved at the same weight, which has an overall positive effect on vehicle weight.

The effect of vibration insulation in the rotor 12 of the electric machine 4 is achieved by connecting one or more elastic coupling elements 22 between the drive side of the rotor 12 (i.e., the side connected to the drive unit) and the driven side of the rotor 12 (i.e., the side connected to a shaft leading to the transmission 6). This arrangement at least largely prevents transfer of any torque fluctuations on the drive side to the driven side.

It is known that the transfer of vibrational energy at excitation frequencies above a resonance frequency of the vibration system is dynamically reduced by incorporating elastic coupling elements between vibration systems. Since the resonance frequency in this type of vibration insulation is lower than the exciter frequency and since a low resonance frequency is achieved by limited spring rigidity and/or high moment of inertia, this area of operation is also called "soft tuning". The vibration insulation effect is due essentially to the fact that the output side of the vibration insulation "lags behind" the vibrations of the input side generated by the exciter source during soft tuning so that no significant energy transfer occurs, and indeed, the greater the exciter frequency relative to the resonance frequency, the less transfer occurs.

The vibration insulation device integrated in the rotor 12 therefore, shields the part of the drive train lying behind it from torsional vibrations from the part of the drive train lying in front of it. In addition, insulation occurs relative to linear vibrations from the internal combustion engine, depending on the layout of the vibration insulation.

In a preferred variant, the vibration insulation device integrated in the rotor 12 comprises two basic elements. One of the basic elements, called the primary part 14, is connected to rotate in unison with the drive side of the drive train, for example, to a crankshaft of the internal combustion engine. The other basic element, called the secondary part 18, is connected to rotate in unison with the driven side of the drive train, (for example, is connected to an input shaft of the transmission 6). The two basic elements 14, 18 are connected together in torsionally elastic fashion. In other words, the two basic elements 14, 18 are isolated from each other in terms of torsional oscillation.

Persons skilled in the art will appreciate that the two basic elements 14, 18 in the rotor 12 can be incorporated in both possible arrangements in the drive train, namely, the primary part 14 connected on the drive side to the internal combustion engine and the secondary part 18 connected to the driven side, or vice-versa. The electric machine 4 is accordingly coupled directly or via the vibration insulation device to the internal combustion engine or the driven side. This description of a preferred practical example of the primary and secondary parts 14, 18 applies to both of the possible arrangements.

Even if considerable freedom of design with respect to vibration insulation is offered by the hollow design of the rotor 12 with reference to electric and magnetic functions, in a particularly compact embodiment the rotor 12 is annular and the vibration insulation 22 is arranged with its two basic elements concentric to and in the interior of the rotor 12. In this manner a compact and robust elastic coupling can be achieved between the primary and secondary parts 14, 18, for example, by several spring elements 22 arranged along the periphery between the primary and secondary parts mounted to rotate opposite each other, each of which is fastened with one end to the primary part 14 and with the other end to the secondary part 18.

The rotor 12 itself advantageously forms one of the two basic elements of the vibration insulation device, for example the primary part 14. In this case the electric machine 4 essentially comprises three components, namely the stator 10, the rotor/primary part 14 and the secondary part 18 of the vibration insulation device.

As already mentioned above, the dynamic vibration insulation is primarily effective in the region of soft tuning, i.e., above the resonance frequency of the vibration system, i.e., at low resonance frequency. Such soft tuning is preferably achieved by providing additional flywheel masses 24 on the primary part 14 and/or on the secondary part 18. These are counterbalanced, especially rotationally symmetric, for example, annular. By varying the flywheel masses 24 and/or by varying the rigidity of the elastic coupling 22, the vibration properties of the drive train can be influenced over a wide extent. The resonance frequency of the vibration system can be shifted below the exciter frequency range by including additional masses that increase the moment of inertia on the primary and/or secondary part, and/or, optionally, by selection of low spring rigidity. Even when the exciter frequency varies over a broad range, for example, by the speed range of an internal combustion engine, resonances in the region of high critical speed are at least avoided by the mentioned expedient. In the case of two flywheel masses, this type of vibration insulation is also called "two-mass-flywheel".

In another advantageous variant, the mentioned flywheel masses 24 are coupled in torsionally elastic fashion to the primary 14 and/or secondary part 18. In addition to the vibration insulation effect of the elastic coupling between the primary and secondary parts 14, 18, an absorption effect is also achieved in simple fashion by this flywheel arrangement. The resonance frequency of the system can be advantageously shifted into a favorable region, for example, to lower frequencies, and the vibration reduction of the system optionally increased.

Another advantageous measure to support the reduction in vibration consists of providing friction surfaces 40 between parts of the primary and secondary parts 14, 18. These friction surfaces are mounted in torsionally elastic fashion, at least in sections. These friction surfaces have a damping effect or, more precisely, an energy dissipating effect. If, despite the aforementioned measures, the resonance frequency of the vibration system should still lie in the speed range of the internal combustion engine, the friction surfaces between the primary and secondary parts 14, 18 cause a flattening of the interfering resonance increase based on damping.

The rotor 12 of the electric machine 4 is advantageously coupled to rotate in unison with one of the two basic elements, (i.e., either the primary part 14 or the secondary part 18). In this embodiment of the electric machine 4, the basic element of the vibration insulation device coupled to rotate in unison with the rotor 12 and, optionally, in one piece does not assume any of the electric or magnetic functions of the rotor 12. These two parts 14, 18 are therefore functionally decoupled with respect to these functions. (However, in a mechanical respect, functional coupling exists owing to the weight of the rotor, which contributes to the moment of inertia of the vibration system). As an alternative, one of the basic elements 14, 18 can at least partially assume electric and/or magnetic rotor functions, for example, perhaps conduct currents or magnetic flux in it. In this case the rotor 12 and one of the basic elements 14, 18 of the vibration insulation device are, therefore, also advantageously coupled with respect to electric and/or magnetic functions.

Whereas electric machines that are mounted on a shaft in the drive train of a vehicle ordinarily have a rotor mounted on two sides, the rotor of the disclosed electric machine 4 is advantageously mounted only on one side and favorably creates a cavity for integration of the vibration insulation 22. The basic element 18 of the vibration insulation device which is not coupled to rotate in unison with the rotor 12 generally has an additional bearing 20, which, however, does not represent a bearing of the rotor 12 (as well as the other basic element 14) owing to the interposed elastic coupling 22.

In principle, any type of electric machine which can impose an appropriate torque, depending on the application can be employed in the disclosed apparatus, be it a dc, ac, three-phase asynchronous, three-phase synchronous or linear machine. A rotary field machine in an asynchronous or synchronous design is particularly favorable for integration of the vibration insulation, whose rotor 12 is a squirrel cage rotor or a rotor with salient magnetic poles. The short circuit rotor in the asynchronous machine can be a hollow squirrel cage rotor 12 with cage bars 21 in the axial direction. In other embodiments the rotor 12 has windings that can be shorted externally via slip rings. The salient magnetic poles of the rotor 12 in the synchronous machine are achieved, for example, with permanent magnets or, preferably, electromagnets that are fed with an exciter current via slip rings.

As mentioned above, the disclosed electric machine 4 can be used with particular advantage as a starter for starting an internal combustion engine. In this case, the rotor 12 of the electric machine 4 is connected to a crankshaft of the internal combustion engine either rigidly or via the vibration insulation device, and is supplied with the necessary startup torque for starting the internal combustion engine. The torque is transferred to the crankshaft without an auxiliary unit connected in between. In this manner the electric machine 4 affects the role of a starter with integrated vibration insulation, which, because of its design as a direct starter, is particularly simple, free of wear, rapid and low-noise, since it does not require any additional means, like additional couplings, additional gears, freewheels, etc.

The disclosed electric machine 4 can also preferably serve as a generator to supply an electric consumer of the vehicle and/or one or more vehicle batteries with electricity. If the electric machine 4 is positioned with its rotor 12 on the crankshaft of a vehicle internal combustion engine and is supplied with the necessary startup torque by this shaft, during starting the machine 4 can be operated as a motor and, after starting of the internal combustion engine, as a generator. The starter/generator combination saves one of the two units ordinarily used for this purpose, namely either the starter or the generator.

Use of the electric machine 4 as a generator vehicle brake is also advantageous, in which the created energy is stored for reuse. Unlike ordinary retarders, the brake energy is converted without additional units to electrical energy. This conversion is achieved largely free of wear owing to the electromagnetic coupling of the electric machine. In principle, the energy produced in this case can be directly taken off by the consumer or "burned" in some other way and/or stored recuperatively.

In another variant, the electric machine 4 may also be used to drive the vehicle, especially as an auxiliary drive in addition to the internal combustion engine, (e.g., as an acceleration support (so-called booster function)). The internal combustion engine of the vehicle can then be dimensioned smaller from the outset, which permits operation with higher effective average pressure and consequently lower fuel consumption.

The electric machine 4 preferably serves as an active torsional vibration damper, which generates alternating torques in counterphase to the rotational irregularities in the drive train to compensate for the rotational irregularities. The rotor 12, which is exposed to the counter torque, can then be connected on the drive or driven side to the drive train, i.e., connected in front of or after the vibration insulation. If the rotor is coupled on the driven side, for example, it is supplied with a counterphase alternating torque of the same magnitude in order to compensate for torsional vibrations still present that overcome the vibration insulation.

The limited size of the electric machine 4 has a particularly favorable effect here, since the electric machine itself can be accommodated in the immediate vicinity of the internal combustion engine with the least possible space, (i.e., at the location of one of the main vibration or disturbance sources in the vehicle, where vibration or noise formation can be counteracted simply and effectively even during startup).

In the creation of an alternating torque opposite the rotational irregularities the electric machine is operated periodically in alternation as an (accelerating) electric motor and as a (braking) generator. The energy recovered in the generator operation can be temporarily stored to advantage.

The teachings of the invention may also be applied via a process for operating an electric machine assuming one or more of the aforementioned functions. The advantages mentioned above apply in similar fashion to the process.

Although certain instantiations of the teachings of the invention have been described herein, the scope of coverage of this patent is not limited thereto. On the contrary, this patent covers all instantiations of the teachings of the invention fairly falling within the scope of the appended claims either literally or under the doctrine of equivalents.

What is claimed is:

1. An apparatus comprising:
   a drive train having a drive side, a driven side, and a torque path by which torque is transferred from the drive side to the driven side;

a stator;

a rotor disposed adjacent the stator within the torque path of the drive train, the rotor defining a substantially hollow interior; and a vibration insulation device disposed at least in part within the hollow interior of the rotor and within the torque path of the drive train, the vibration insulation device including a first part connected to the drive side of the drive train, a second part connected to the driven side of the drive train, and a torsionally elastic coupling device coupling the first and second parts, such that the first part is radially disposed relative to the second part.

2. An apparatus as defined in claim 1 wherein the torsionally elastic coupling device comprises one or more helical springs.

3. An apparatus as defined in claim 1 wherein the torsionally elastic coupling device comprises one or more coil springs.

4. An apparatus as defined in claim 1 wherein the rotor is annular and the vibration insulation device is disposed in concentric relation to the rotor.

5. An apparatus as defined in claim 1 further comprising a flywheel mass coupled to one of the first and second parts of the vibration insulation device.

6. An apparatus as defined in claim 5 wherein the flywheel mass is coupled to the one of the first and second parts of the vibration insulation device by a second torsionally elastic coupling.

7. An apparatus as defined in claim 6 wherein the second torsionally elastic coupling comprises an elastomer layer.

8. An apparatus as defined in claim 1 further comprising a friction surface coupled to one of the first and second parts of the vibration insulation device via a second torsional elastic coupling, the friction surface being disposed between the first and second parts of the vibration insulation device.

9. An apparatus as defined in claim 1 wherein one of the first and second parts of the vibration insulation device rotates in unison with the rotor.

10. An apparatus as defined in claim 1 wherein one of the first and second parts of the vibration insulation device at least partially assumes an electromagnetic function of the rotor.

11. An apparatus as defined in claim 1 wherein the rotor is mounted on one side.

12. An apparatus as defined in claim 1 wherein the apparatus is a rotating field machine and the rotor comprises a squirrel cage rotor having salient magnetic poles.

13. An apparatus as defined in claim 1 wherein the rotor and stator are excited to act as a starter for starting an internal combustion engine associated with the drive train.

14. An apparatus as defined in claim 1 wherein the rotor and stator are excited to act as a generator.

15. An apparatus as defined in claim 1 wherein the rotor and stator are excited to act as an auxiliary drive to support acceleration of a vehicle associated with the drive train.

16. An apparatus as defined in claim 1 wherein the rotor and stator are excited to act as an active torsional vibration dampener which generates alternating torques to compensate for rotational irregularities detected in the rotor.

17. An apparatus as defined in claim 13 further comprising a control device to controllably excite the stator to effect the rotation of the rotor.

18. An apparatus as defined in claim 15 further comprising a control device to controllably excite the stator to effect the rotation of the rotor.

19. An apparatus as defined in claim 16 further comprising a control device to controllably excite the stator to effect the rotation of the rotor.

* * * * *